Aug. 2, 1966     A. M. SANDERSON     3,263,879

HOOK FOR FISH STRINGERS

Filed Oct. 28, 1964

INVENTOR.
ARCHIE M. SANDERSON
BY
Wilson, Settle & Craig
ATTORNEYS

United States Patent Office 3,263,879
Patented August 2, 1966

3,263,879
HOOK FOR FISH STRINGERS
Archie M. Sanderson, 3044 Lincoln, Dearborn, Mich.
Filed Oct. 28, 1964, Ser. No. 407,169
2 Claims. (Cl. 224—7)

This invention relates to fish stringers and more particularly to hooks for said stringers.

Fish stringers having hooks which require both hands to manipulate present a problem of opening the hook and at the same time placing the fish thereon.

It is an object of my invention to provide an improved hook for fish stringers which may be readily and easily operated by one hand.

Another object of my invention is to provide a hook for fish stringers which has a resilient body portion arranged to move a hook portion laterally away from its keeper and simultaneously move the keeper laterally away from the hook to provide a large open space for attaching a fish to the hook and then automatically returning the hook to its keeper.

Other objects of this invention will appear in the following description and appended claims, reference being had to the accompanying drawings forming a part of this specification wherein like reference characters designate corresponding parts in the several views.

Figure 1:
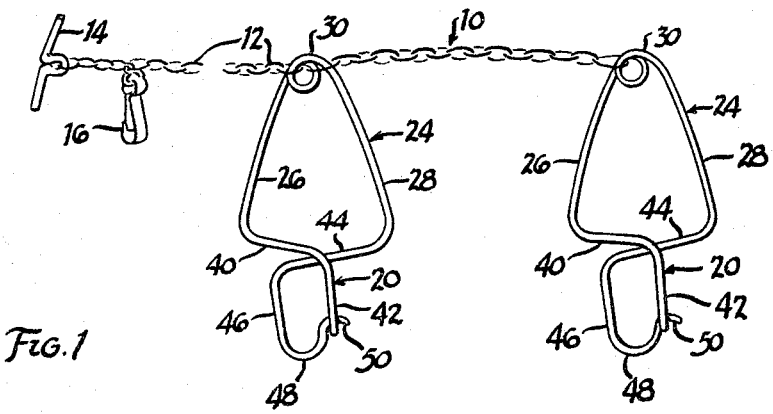
FIGURE 1 is a side elevational view of my fish stringer and showing my improved hooks embodying features of my invention.
Figure 2:
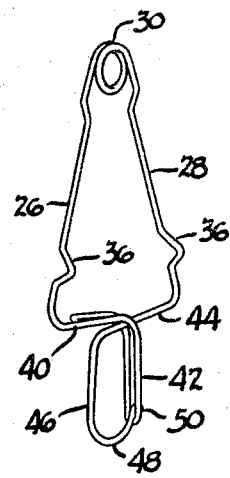
FIGURE 2 is a perspective view of the hook.
Figure 3:
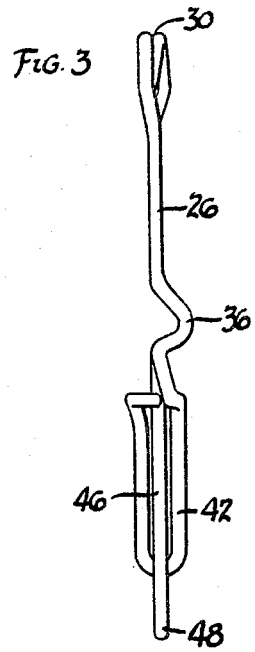
FIGURE 3 is a side view of the hook.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with my invention, I provide a hook for fish stringers which may be readily manipulated with one hand. It is made of resilient material such as spring steel and includes a main body portion which is movable to cause the hook portion away from its keeper and to permit it to automatically return to its keeper.

Referring to the drawing, the numeral 10 designates a fish stringer which includes a link chain 12 having an attaching element or bar 14 connected on one end thereof and a snap ring 16 for locking the stringer to a boat.

Attached to the chain 12 are my improved hooks 20 which are identical, so only one will be described. Any number of hooks 20 may be attached to the chain 12, preferably by S clamps.

Figure 5:
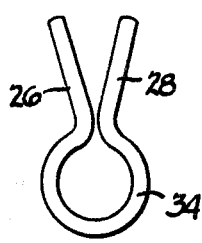
FIGURE 5 is a fragmentary view of a portion of a modified form of the hook.

The hooks 20 are made of spring steel wire of one piece and comprise a main body portion 24 consisting of legs 26 and 28 joined on one end by a coil or eye 30. If desired, the legs 26 and 28 may be joined by a loop 34, as shown in FIGURE 5. Each of the legs 26 and 28 have a bent portion 36 for rigidity and to provide for gripping by the user's hand. Legs 26 and 28 diverge from eye 30.

Leg 26 has a laterally extending portion 40 on the end opposite the eye 30. The portion 40 is directed toward leg 28 and has a looped keeper 42 extending at right angles thereto. The leg 28 has a laterally extending portion 44 on the end opposite the eye 30. The portion 44 is directed toward leg 26 and has a hook portion 46 with part thereof being at right angles thereto, and a downwardly extending curved portion 48 with a sharpened point 50. The curved portion 48 extends into the looped keeper 42 but is readily movable into and out of the keeper.

Figure 4:
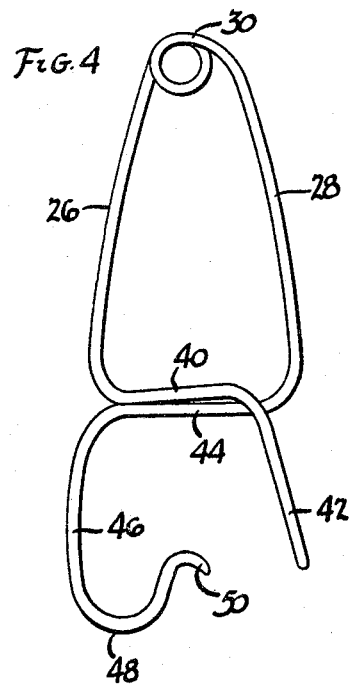
FIGURE 4 is a view of the hook in open position.

The hook 20 may be readily manipulated with one hand by simply moving the diverging legs 26 and 28 toward parallel alignment. When this takes place, the laterally extending portions 40 and 44 cause the looped keeper 42 to move laterally away from the hook portion 46 and the hook portion to simultaneously move laterally away from the looped keeper 42. The curved portion 48 is free to move into and out of the keeper 42. When the legs 26 and 28 are moved toward vertical alignment, the hook and keeper are moved apart to provide a large space therebetween to attach a fish to the hook 46. After the fish is attached to the hook 46, the legs 26 and 28 are released, and the hook and keeper automatically move toward each other with the curved portion 48 in the loop of keeper 42. FIGURE 4 shows the hook 20 in partial open position, however, the legs 26 and 28 may be moved further toward vertical or parallel alignment when desired to provide a larger space between the hook and its keeper. The fish is attached to the hook by inserting the point 50 and curved portion through the thin cartilage in the lower jaw, so that the fish may continue normal breathing through its gills while in the water. When a fish is placed on the hook 46, the weight of the fish causes the curved hook portion 48 to engage the looped keeper 42 to lock the hook portion 48 in the keeper. To release the fish from the hook, the fish is held in one hand and the hook 20 manipulated with the other hand to separate the hook portion 48 from the keeper 42, whereupon the fish may be readily removed.

Although only preferred forms of the invention have been illustrated, and those forms described in detail, it will be apparent to those skilled in the art that various modifications may be made therein without departing from the spirit of the invention or from the scope of the appended claims.

I claim:

1. A hook for fish stringers comprising a resilient wire bent to form a flexible body portion, a looped keeper extending from one end of said body portion, a curved hook portion extending from an opposite end of said body portion, said curved hook portion terminating in an arcuate locking lip, said lip and keeper being biased by the resilient wire to a closed position wherein the lip is within the keeper without locking engagement therewith, the resiliency and shape of the wire permitting a load placed on the hook portion to weigh down the lip into a hooked locking engagement with the keeper.

2. A hook for fish stringers comprising a resilient wire bent to form a flexible body portion, a keeper extending from one end of said body portion, a hook portion extending from the opposite end of said body portion, said hook portion terminating in an arcuate locking lip, said lip and keeper being biased by the resilient wire to a closed position wherein the lip is above a portion of the keeper without locking engagement therewith, the resiliency and shape of the wire permitting a load placed on the hook portion to weigh down the lip into a hooked locking engagement with the keeper.

References Cited by the Examiner

UNITED STATES PATENTS

| | | | |
|---|---|---|---|
| 2,594,661 | 4/1952 | Lehmann | 224—7.1 |
| 2,850,780 | 9/1958 | Alison | 24—161 |
| 3,111,734 | 11/1963 | Pachner | 24—237 |

FOREIGN PATENTS

| | | |
|---|---|---|
| 582,244 | 11/1946 | Great Britain. |
| 643,820 | 9/1950 | Great Britain. |

GERALD M. FORLENZA, *Primary Examiner.*

J. OLDS, *Assistant Examiner.*